US012519565B1

(12) United States Patent
Leyba (10) Patent No.: US 12,519,565 B1
(45) Date of Patent: Jan. 6, 2026

(54) METHOD AND SYSTEM FOR EQUALIZING DIGITAL SIGNALS USING PARTIAL RESPONSE MAXIMUM LIKELIHOOD SEQUENCE EQUALIZATION

(71) Applicant: Keysight Technologies, Inc., Santa Rosa, CA (US)

(72) Inventor: David Leyba, Santa Rosa, CA (US)

(73) Assignee: KEYSIGHT TECHNOLOGIES, INC., Santa Rosa, CA (US)

(*) Notice: Subject to any disclaimer, the term of this patent is extended or adjusted under 35 U.S.C. 154(b) by 0 days.

(21) Appl. No.: 18/761,399

(22) Filed: Jul. 2, 2024

(51) Int. Cl.
*H04L 1/00* (2006.01)
*H04L 25/03* (2006.01)

(52) U.S. Cl.
CPC ...... *H04L 1/0054* (2013.01); *H04L 25/03012* (2013.01); *H04L 2025/03369* (2013.01)

(58) Field of Classification Search
CPC ............ H04L 1/0054; H04L 25/03012; H04L 2025/03369
See application file for complete search history.

(56) References Cited

U.S. PATENT DOCUMENTS

| 11,831,475 | B1 | 11/2023 | Liao et al. | |
|---|---|---|---|---|
| 2005/0180039 | A1* | 8/2005 | Mayergoyz | G11B 5/012 |
| 2017/0292977 | A1* | 10/2017 | Pickerd | G01R 13/00 |

OTHER PUBLICATIONS

Jia Qi et al., "28-Gb/s Faster-than-Nyquist PON with Optimized ISI Cancellation Algorithm", The 23rd OptoElectronics and Communications Conference (OECC 2018) Technical Digest, Jul. 2-6, 2018, Jeju, Korea, pp. 1-2.

* cited by examiner

*Primary Examiner* — Vineeta S Panwalkar (57) ABSTRACT

A test system implemented method of equalizing a digital signal under test (SUT) results in a waveform representation of the output of a Partial Response Maximum Likelihood Sequence Equalizer (PR-MLSE). The method includes applying the SUT, having greater than one symbol period of inter-symbol interference (ISI), to a feed forward equalizer to obtain a Partial Response equalized sequence $r_k$ having an ISI characterized as (1+αD), wherein $r_k$ denotes the kth equalized sample of the waveform, sampled at the symbol rate, and α is a programmable variable. The method further includes obtaining a known symbol sequence, $m_k$, as a user input to the system, and determining y(capped)$_k$, the kth sample of the PR-MLSE equivalent waveform, in accordance with the following equation, $$\hat{y}_k = \frac{r_k + \alpha r_{k+1} - \alpha(m_{k-1} + m_{k+1})}{1 + \alpha^2}.$$

9 Claims, 8 Drawing Sheets

METHOD AND SYSTEM FOR EQUALIZING DIGITAL SIGNALS USING PARTIAL RESPONSE MAXIMUM LIKELIHOOD SEQUENCE EQUALIZATION

FIELD

The inventive concepts generally relate to methods and systems for processing high speed digital signals, and particularly, to methods and systems of equalizing digital signals using partial response maximum likelihood sequence equalization.

BACKGROUND

In the field of digital signal processing, particularly in the context of electrical and optical channels, Partial Response Maximum Likelihood Sequence Detection/Equalization (PR-MLSE) has become a prevalent component. PR-MLSE is a technique used to estimate the discrete symbol sequence of a signal. This technique is commonly employed in various standards documents and is a standard component in many electrical and optical channels.

The output of a Maximum Likelihood Sequence Equalizer (MLSE) is the estimated discrete symbol sequence. However, the discrete nature of this output poses a limitation when it comes to the construction of an eye diagram. An eye diagram is a common tool used in the analysis of digital signals. It provides a visual representation of a digital signal's performance, allowing for the evaluation of the system's quality metrics.

However, the discrete output of an MLSE prevents the construction of an eye diagram that takes into account the performance of the MLSE. This limitation restricts the quality metrics that can be evaluated for a system using an MLSE. Therefore, there is a recognized challenge in the field to create a continuous signal that can be used for normal eye mode measurements while maintaining the performance correlation to an MLSE receiver using threshold testing.

Furthermore, in real-world implementations, the feedback of estimated symbols can lead to bursts of errors if the estimates are incorrect. This can result in unstable and inconsistent results, which can be problematic for systems that require reliable and repeatable measurements.

SUMMARY

According to an aspect of the inventive concepts, a test system implemented method of equalizing a digital signal under test (SUT) is provided that results in a waveform representation of the output of a Partial Response Maximum Likelihood Sequence Equalizer (PR-MLSE). The method includes applying the SUT, having greater than one symbol period of inter-symbol interference (ISI), to a feed forward equalizer to obtain a Partial Response equalized sequence $r_k$ having an ISI characterized as $(1+\alpha D)$, wherein $r_k$ denotes the kth equalized sample of the waveform, sampled at the symbol rate, and $\alpha$ is a programmable variable. The method further includes obtaining a known symbol sequence, $m_k$, as a user input to the system, and determining $\hat{y}_k$, the kth sample of the PR-MLSE equivalent waveform, in accordance with the following equation, $$\hat{y}_k = \frac{r_k + \alpha r_{k+1} - \alpha(m_{k-1} + m_{k+1})}{1+\alpha^2}.$$

The digital SUT may be an optical signal, and the test system may be an oscilloscope.

The method may further include generating an eye diagram of the PR-MLSE equivalent waveform on a display on the oscilloscope.

According to another aspect of the inventive concepts, a non-transitory tangible computer readable medium having stored thereon executable instructions embodied in the computer readable medium that when executed by at least one processor of a test system cause the test system to execute the method described above.

Here, the test system may be an oscilloscope, and the non-transitory tangible computer readable medium may be the memory of the oscilloscope.

According to still another aspect of the inventive concepts, an oscilloscope is provided including an an input port configured to receive a digital signal under test (SUT) having greater than one symbol period of inter-symbol interference (ISI). The oscilloscope includes a feed forward sampler configured to process the SUT to obtain a Partial Response equalized sequence $r_k$ having an ISI characterized as $(1+\alpha D)$, wherein $r_k$ denotes the kth equalized sample of the waveform, sampled at the symbol rate, and $\alpha$ is a programmable variable. The oscilloscope further includes a waveform generator configured to generate a Partial Response Maximum Likelihood Sequence Equalizer (PR-MLSE) equivalent waveform in accordance with the following equation, $$\hat{y}_k = \frac{r_k + \alpha r_{k+1} - \alpha(m_{k-1} + m_{k+1})}{1+\alpha^2}$$

where $m_k$ is a known symbol sequence as a user input to the oscilloscope, and $\hat{y}_k$ is the kth sample of the PR-MLSE equivalent waveform.

The oscilloscope may include a display and may be configured to display an eye diagram of the PR-MLSE equivalent waveform on the display.

BRIEF DESCRIPTION OF THE DRAWINGS

The above and other aspects and features of the inventive concepts will become readily apparent from the detailed description that follows, with reference to the accompanying drawings, in which.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted to avoid obscuring the description of the example embodiments. Such methods and apparatuses are clearly within the scope of the present teachings. Further, throughout the drawings, like reference numbers refer to the same or similar elements.

The terminology used herein is for purposes of describing particular embodiments only, and is not intended to be limiting. The defined terms are in addition to the technical and scientific meanings of the defined terms as commonly understood and accepted in the technical field of the present teachings. As used in the specification and appended claims, the terms 'a', 'an' and 'the' include both singular and plural referents, unless the context clearly dictates otherwise. Thus, for example, 'a device' includes one device and plural devices. Further, for example, when one element is described as being "connected to" another element, the one element may be directly connected to the other element, or indirectly connected to the other element in an operative manner.

Separately, as is traditional in the field of the inventive concepts, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, in the absence of an indication to the contrary, the units and/or modules being implemented by microprocessors or similar may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the example embodiments. Conversely, the blocks, units and/or modules of the example embodiments may be physically combined into more complex blocks, units and/or modules without departing from the scope of the example embodiments.

Real-time oscilloscopes and sampling oscilloscopes are used to characterize high-speed digital data. Testing by real-time oscilloscopes is a part of several industry protocols, such as universal serial bus (USB), ethernet or peripheral component interconnect express (PCIe), which rely on data processing algorithms and statistical methods to determine compliance. Acceptable levels of performance, for a wide variety of metrics, are defined in official specifications for industry protocols.

Figure 1:
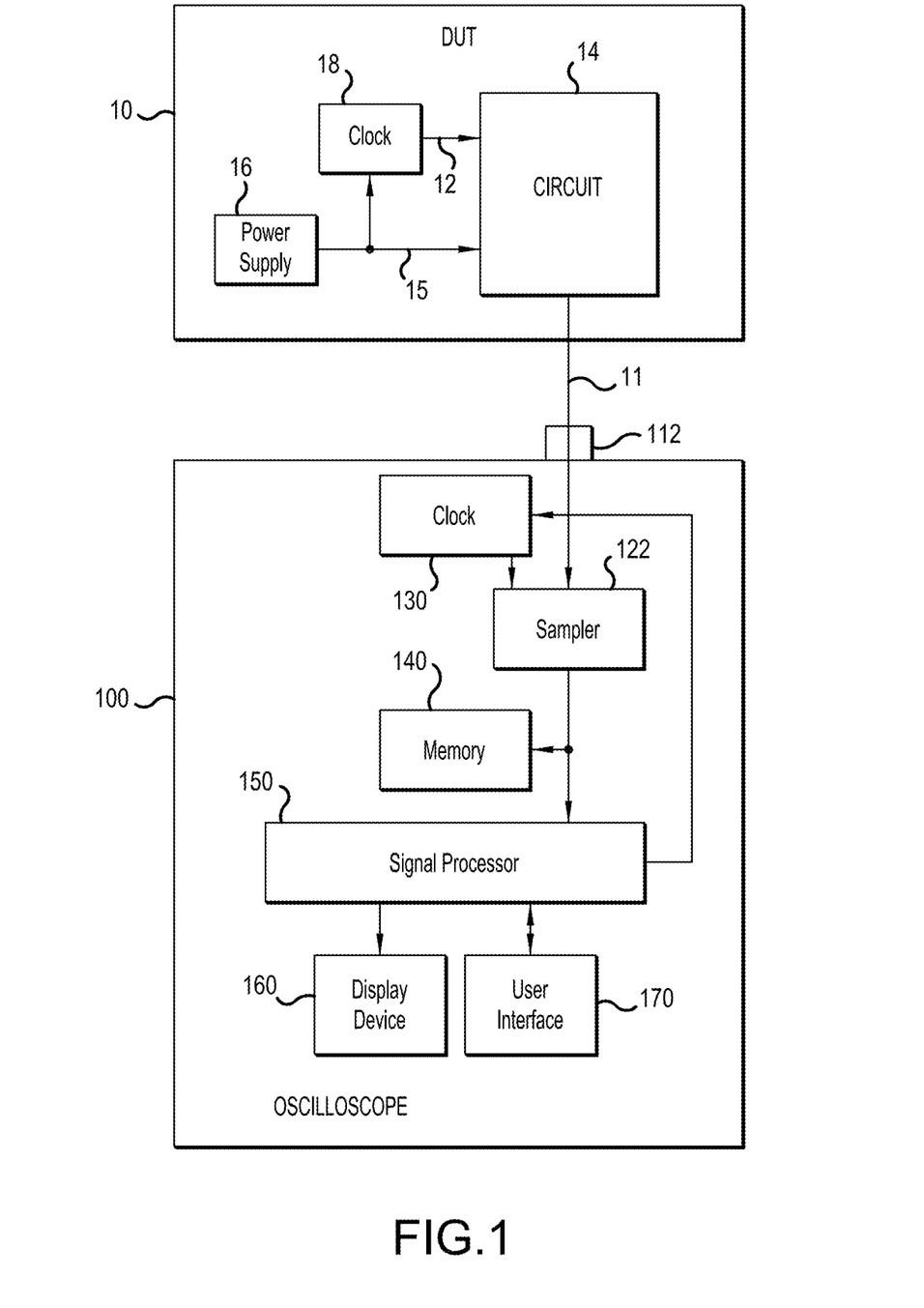
FIG. 1 is a simplified block diagram of an oscilloscope that may be utilized in embodiments of the inventive concepts.

FIG. 1 is a simplified block diagram of an example embodiment of a measurement instrument 100 which may be utilized to test the performance of a high-speed digital signal output by an exemplary device under test (DUT) 10.

In this example, the DUT 10 includes a circuit 14, for example a high speed digital communication circuit or oscillator, at least one power supply 16, and at least one clock 18. The circuit 14 is powered by one or more supply voltages, including at least one supply voltage 15 produced by the power supply 16. The circuit 14 also receives a clock signal 12 from the clock 18 and may use the clock signal 12 to control the timing of edges or bit transitions in one of more signals of the circuit 14.

In exemplary embodiments, the measurement instrument 100 may be a digital oscilloscope, and may include an input port 112 configured to receive the output signal 11 from the DUT 10, a clock 130, a sampler 122 configured to capture samples of the received output signal 11, a memory 140, a signal processor 150, a display device 160 and a user interface 170.

The sampler 122 may include an analog-to-digital converter (ADC) (not shown) which may be clocked in response to the clock 130 of the measurement instrument 100. In some embodiments, clock 130 may be recovered from the captured samples of the signal 11 by any of many clock recovery techniques known to those skilled in the art.

The display device 160 is not limited to any particular type of display technology, and may include a liquid crystal display (LCD), a plasma display, a cathode ray tube (CRT), or the like, together with the associated processor and software for implementing the display device 160. Likewise, the user interface 170 is also not limited, and may include one or more of a keyboard, a keypad, control knobs, a mouse, a trackball, buttons, indicator lights, and so on, together with the associated processor and software for implementing the user interface 170.

The memory 140 which may store therein digitized samples of the DUT signal 11 captured by sampler 122. In that case, in some embodiments the digitized samples may be communicated by the measurement instrument 100 under control of a controller or processor (not shown) via a communications interface (also not shown) to an external device such as a computer where the digitized samples may be processed as described below with respect to signal processor 150. The communication interface may be any suitable interface, for example conforming to standards such as Ethernet, specialized test instrument standards, etc. In some embodiments, the communication interface may allow the measurement instrument 100 to communicate commands and data with one or more external computers and/or other measurement instruments via the Internet.

The memory 140 may also include a working memory for the signal processor 150 including instructions, when executed the by the signal processor 150, carry out the methods described later herein. The working memory storing the instructions can comprise random access memory (RAM), read only memory (ROM), optical read/write memory, cache memory, magnetic read/write memory, flash memory, and/or any other non-transitory computer readable storage medium.

In the case where the techniques of the inventive concepts are executed off-line of the measurement instrument 100, the aforementioned instructions would be stored in remote memory accessible by processor external the measurement instrument 100. Again, the remote working memory storing the instructions can comprise random access memory (RAM), read only memory (ROM), optical read/write memory, cache memory, magnetic read/write memory, flash memory, and/or any other non-transitory computer readable storage medium.

The measurement instrument 100 may include other components and subsystems not illustrated in FIG. 1.

Partial Response Maximum Likelihood Sequence Detection/Equalization (PR-MLSE) has become a common component of many electrical and optical channels in recent standards documents. The output of an MLSE is the estimated discrete symbol sequence. The discrete output prevents the construction of an eye diagram that takes into account the performance of the MLSE, which limits the quality metrics that can be evaluated for a system using an MLSE.

The inventive concepts described below present a derivation to create a continuous signal which will have SER performance correlated to an MLSE receiver using threshold testing. This signal can then be used for normal eye mode measurements.

Figure 2:
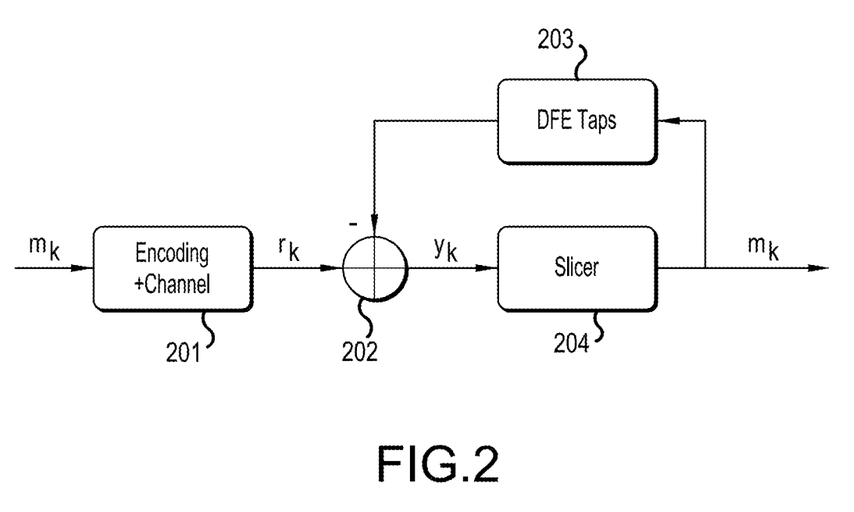
FIG. 2 is a block diagram for reference in describing a "real" implementation of a Decision Feedback Equalizer (DFE)

FIG. 2 is a block diagram for reference in describing a "real" implementation of a Decision Feedback Equalizer (DFE). In the figure, reference number 201 denotes a channel, reference number 202 denotes an adder, reference number 203 denote DFE taps, and reference number 204 denotes a slicer.

Referring to FIG. 2, for a channel of the form $1+b_1D+b_2D^2+\ldots$ the maximum likelihood symbol detector is based on the minimum square distance:

$$\arg\min_{m_k}\left(r_k - \sum_{i=0}^{n} b_i m_{k-i}\right)^2$$

where $r_k$ is the output of the channel 201, $m_j$ is the jth symbol and $b_0=1$.

The output of the DFE are discrete symbol values, m(capped)$_k$, determined by threshold testing by slicer 204 of the modified input signal y(capped)k:

$$\hat{y}_k = r_k - \sum_{i=1}^{n} b_{n-i} m_{k-i}$$

$$\hat{m}_k = \{j \text{ if } th_{j-1} \le \hat{y}_k \le th_j\}$$

In a real DFE implementation, the previous estimated symbol values are used to feed back into the threshold test as above. It is noted here the feedback of estimated symbols can lead to bursts of errors if the estimates are wrong.

Figure 3:
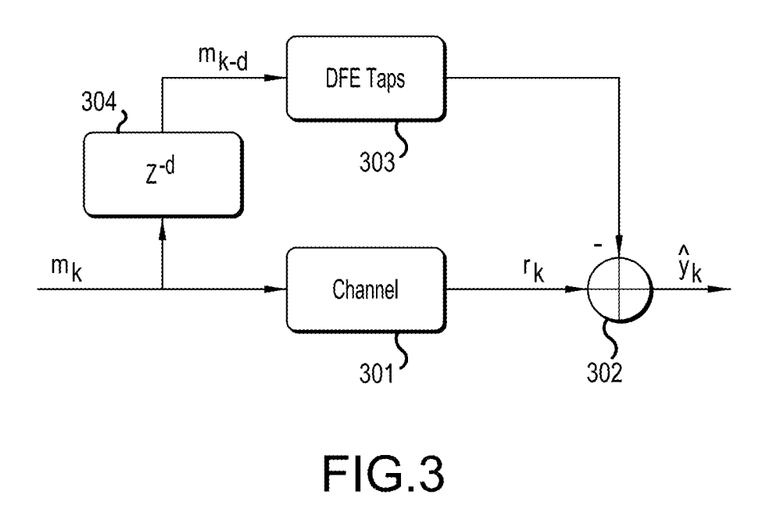
FIG. 3 is a block diagram for reference in describing a scope implementation of a DFE.

A scope implementation of the DFE will now be described with reference to FIG. 3. In the figured, reference number 301 denotes a channel, reference number 203 denotes a channel an adder, reference number 303 denotes DFE taps, and reference number denotes a memory of depth d.

In the real equalizer described previously, the equalizer only has access to the channel output $r_k$ and the previously detected symbols m(capped)$_l$, where l<k. In contrast, in the scope implementation as illustrated in FIG. 3, the equalizer access to the channel output $r_k$ and the previously known input symbols $m_l$, where l<k.

In the scope implementation, continuous output y(capped)$_k$, is used instead of discrete symbols, to determine the signal qualities as seen by the receiver. This allows for standard eye and scope measurements to be made, with possible modifications for discontinuity at eye boundaries. Separately, threshold testing is still needed to generate the feedback values.

A problem with the implementation is that small variations in the input noise, which may cause a symbol error, can lead to large changes in the output signal. This can lead to unstable and inconsistent results. As such, a simplifying assumption is made that all previous symbols are known without error, which leads to a stable and repeatable measurement. The results are well-correlated when compared to the when compared to the real implementation.

The discussion will now be directed to a Maximum Likelihood Sequence Detector (MLSD).

As described previously, for a channel of the form $1+b_1D+b_2D^2+\ldots$ the maximum likelihood symbol detector is based on the minimum square distance:

$$\arg\min_{m_k}\left(r_k - \sum_{i=0}^{n} b_i m_{k-i}\right)^2$$

where $r_k$ is the output of the channel 201, $m_j$ is the jth symbol and $b_0=1$.

If we let the $m_k$ take continuous values, the solution to the minimization problem is the system of equations defined by:

$$m_k = \sum_{l=0}^{n} b_l r_{k-l} - \sum_{i \ne l}^{n} b_l b_i m_{k+l-i} - \sum_{l=1}^{n} b_l m_{k+l}$$

Solving this system of equations and then rounding $m_k$ to the nearest valid symbol values is not guaranteed to be a solution to the original minimization problem. The exception to this is if the sequence length is 1.

In consideration of the above, a simplifying assumption is made: At symbol k assume that $m_j$ is known for all j≤k−1 and j≥k+1. This is essentially equivalent to assuming perfect decoding before and after symbol k, and optimization is over a single continuous variable, renamed y(capped)$_k$, for each symbol.

This is similar to the DFE in a number of ways. The discrete symbol value can be determined by threshold testing:

$$\hat{m}_k = \{j \text{ if } th_{j-1} \le \hat{y}_k \le th_j\}$$

The continuous output signal y(capped)$_k$ (below) can be used to determine the signal qualities as seen by the receiver using eye and scope measurements.

$$\hat{y}_k = \frac{\sum_{l=0}^{n} b_l r_{k-l} - \sum_{i \ne l}^{n} b_l b_i m_{k+l-i} - \sum_{l=1}^{n} b_l m_{k+i}}{\sum_{l=0}^{n} b_l^2}$$

In the meantime, IEEE receivers are specifying a Partial Response MLSE (PR-MLSE) as part of the reference receiver. Linear receivers are used to make rk have a $1+\alpha D$ response. MLSD knowledge of the $1+\alpha D$ response is leveraged to decode the symbol sequence. Applying this partial response special case to the optimization equation of the immediately preceding equation, the continuous output signal y(capped)$_k$ can be characterized as follows:

$$\hat{y}_k = \frac{r_k + \alpha r_{k+1} - \alpha(m_{k-1} + m_{k+1})}{1 + \alpha^2}$$

Figure 4:
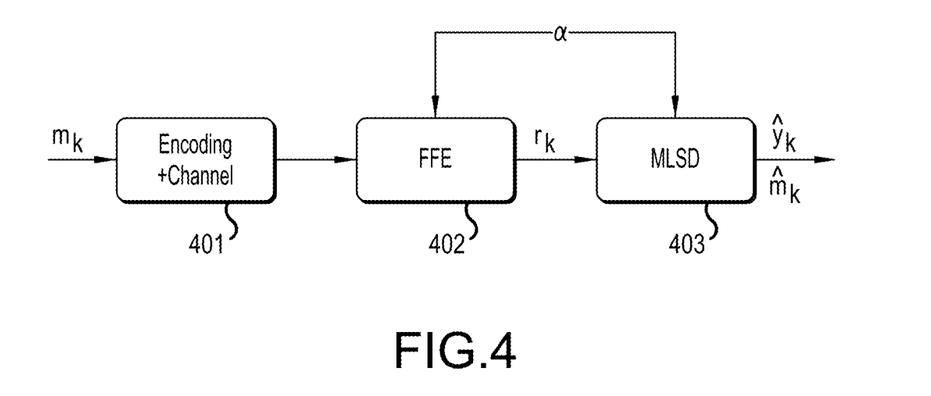
FIG. 4 is a block diagram for reference in describing a system for generating a waveform representation of the output of a Partial Response Maximum Likelihood Sequence Equalizer (PR-MLSE) according to embodiments of the inventive concepts.

Referring now to FIG. 4, in some embodiments of the inventive concepts, an oscilloscope is configured to sample a digital signal under test (SUT) received over a channel 401. In embodiment, the digital SUT has greater than one symbol period of inter-symbol interference (ISI).

A feed forward sampler 402 configured to process the SUT to obtain a Partial Response equalized sequence $r_k$ having an ISI characterized as (1+πD), wherein $r_k$ denotes the kth equalized sample of the waveform, sampled at the symbol rate, and a is a programmable variable.

A waveform generator 403 (labeled MLSD in FIG. 4) is configured to generate a Partial Response Maximum Likelihood Sequence Equalizer (PR-MLSE) equivalent waveform in accordance with the following equation, $$\hat{y}_k = \frac{r_k + \alpha r_{k+1} - \alpha(m_{k-1} + m_{k+1})}{1 + \alpha^2}$$

where $m_k$ is a known symbol sequence as a user input to the oscilloscope, and $y_k$ is the kth sample of the PR-MLSE equivalent waveform.

Figure 5:
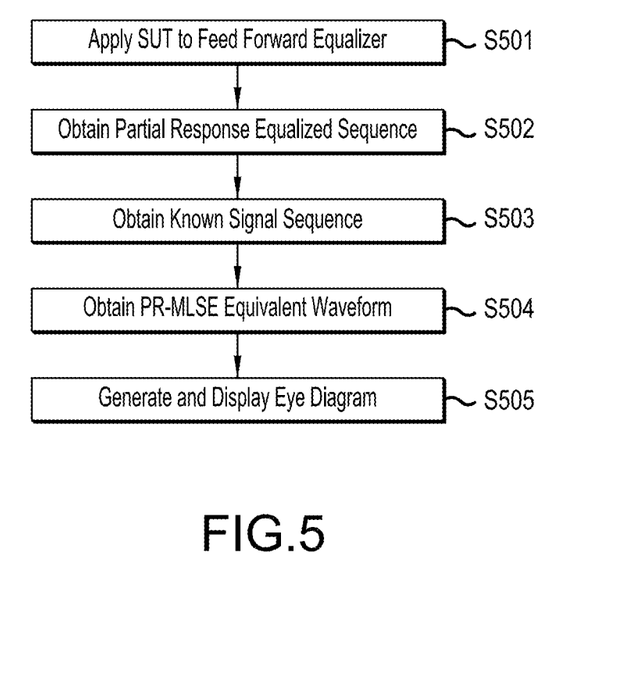
FIG. 5 is a flow chart for reference in describing a method for generating a waveform representation of the output of a Partial Response Maximum Likelihood Sequence Equalizer (PR-MLSE)

Referring now to FIG. 5, in some embodiments of the inventive concepts, a method of equalizing a digital signal under test (SUT) is provided in a waveform representation of the output of a Partial Response Maximum Likelihood Sequence Equalizer (PR-MLSE). The method includes applying the SUT, having greater than one symbol period of inter-symbol interference (ISI), to a feed forward equalizer (S501) to obtain a Partial Response equalized sequence $r_k$ (S502) having an ISI characterized as (1+αD). Here, $r_k$ denotes the kth equalized sample of the waveform, sampled at the symbol rate, and α is a programmable variable. The method further includes obtaining a known symbol sequence, $m_k$ (S503), as a user input to the system; and determining $y_k$, the kth sample of the PR-MLSE equivalent waveform (S504), in accordance with the following equation, $$\hat{y}_k = \frac{r_k + \alpha r_{k+1} - \alpha(m_{k-1} + m_{k+1})}{1 + \alpha^2}.$$

It is noted that the digital SUT may be an optical signal. Further, the method may be implemented by a test system, an example of which is an oscilloscope. The method may further include generating an eye diagram (S505) of the PR-MLSE equivalent waveform on a display on the oscilloscope.

Figure 6:
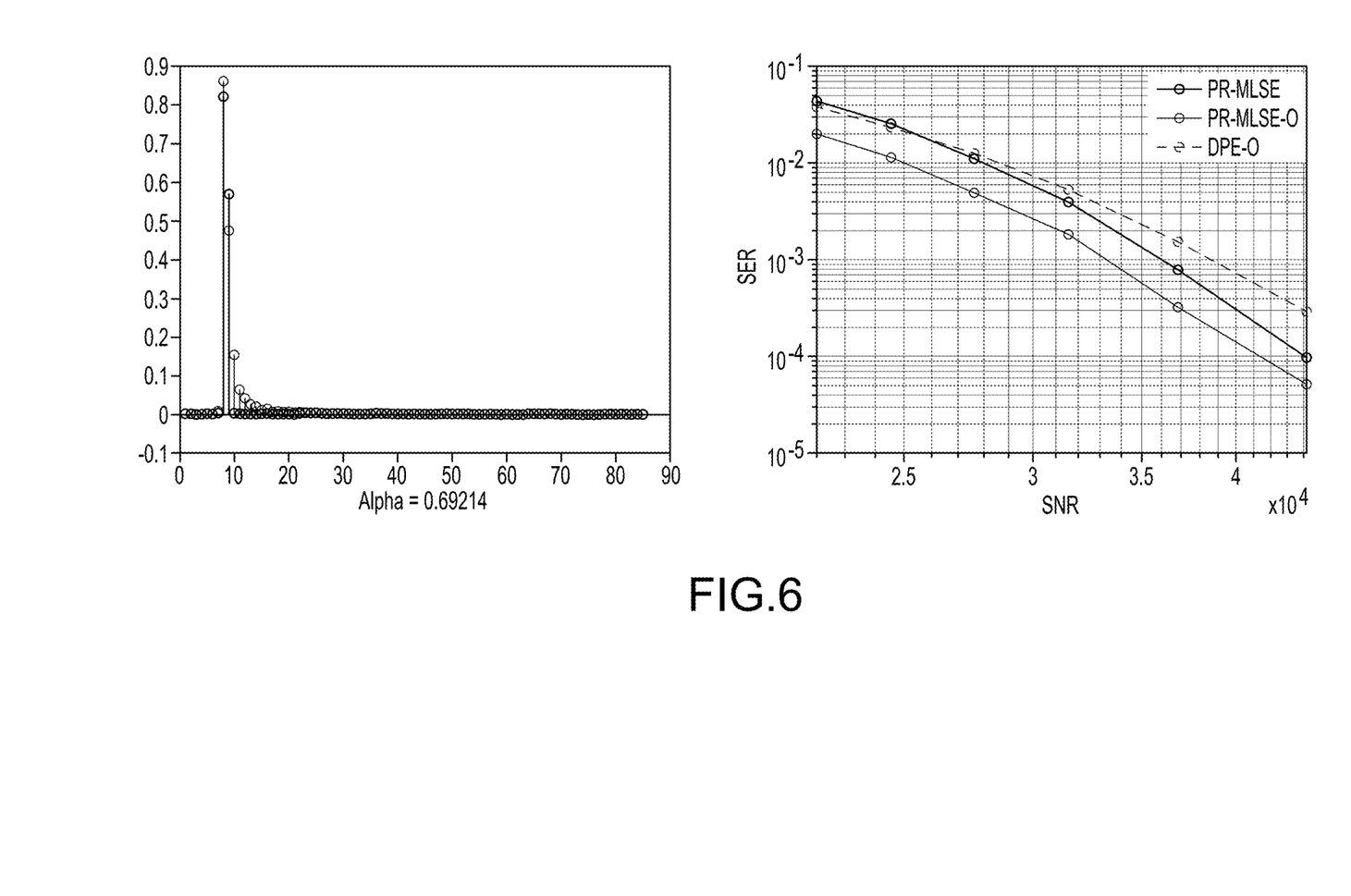
FIGS. 6, 7 and 8 graphically represent the performance of embodiments of the inventive concepts and the scope of implementation of DFE (DFE-O) and the normal MLSE (PR-MLSE), for three different tested channels, respectively.
Figure 7:
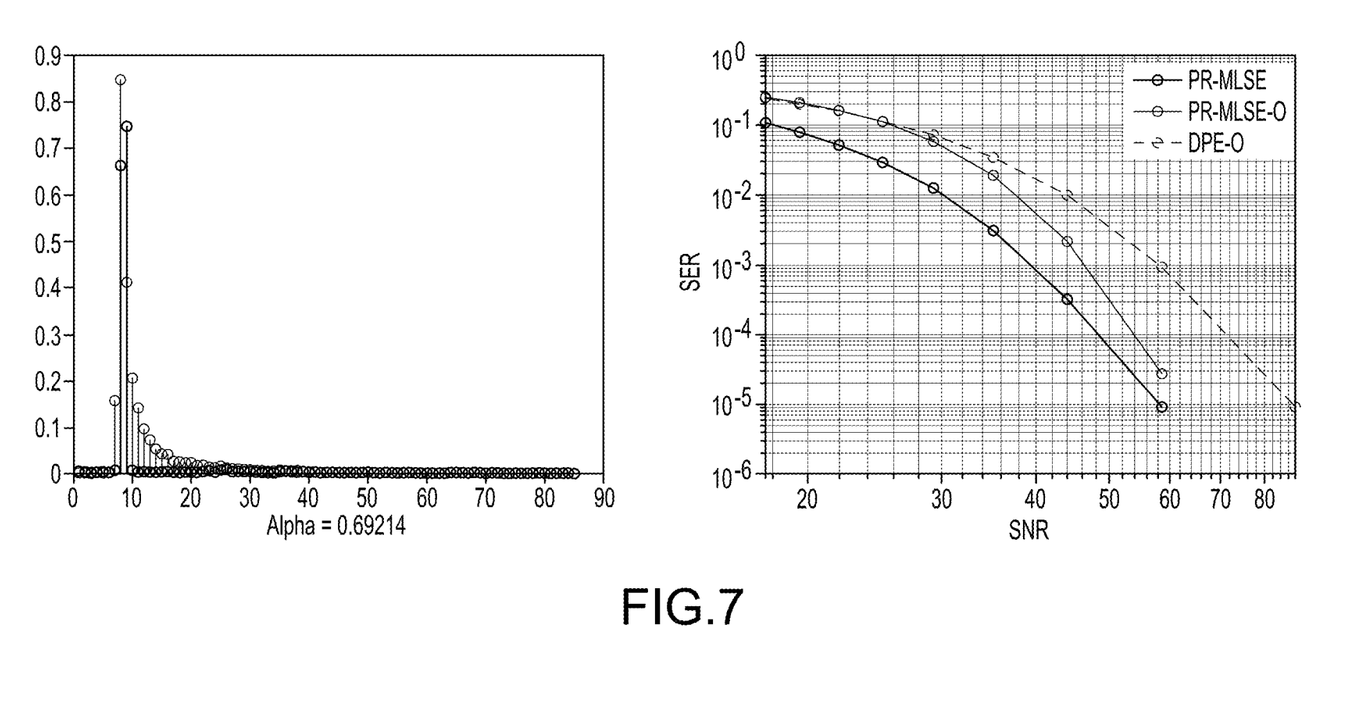
Figure 8:
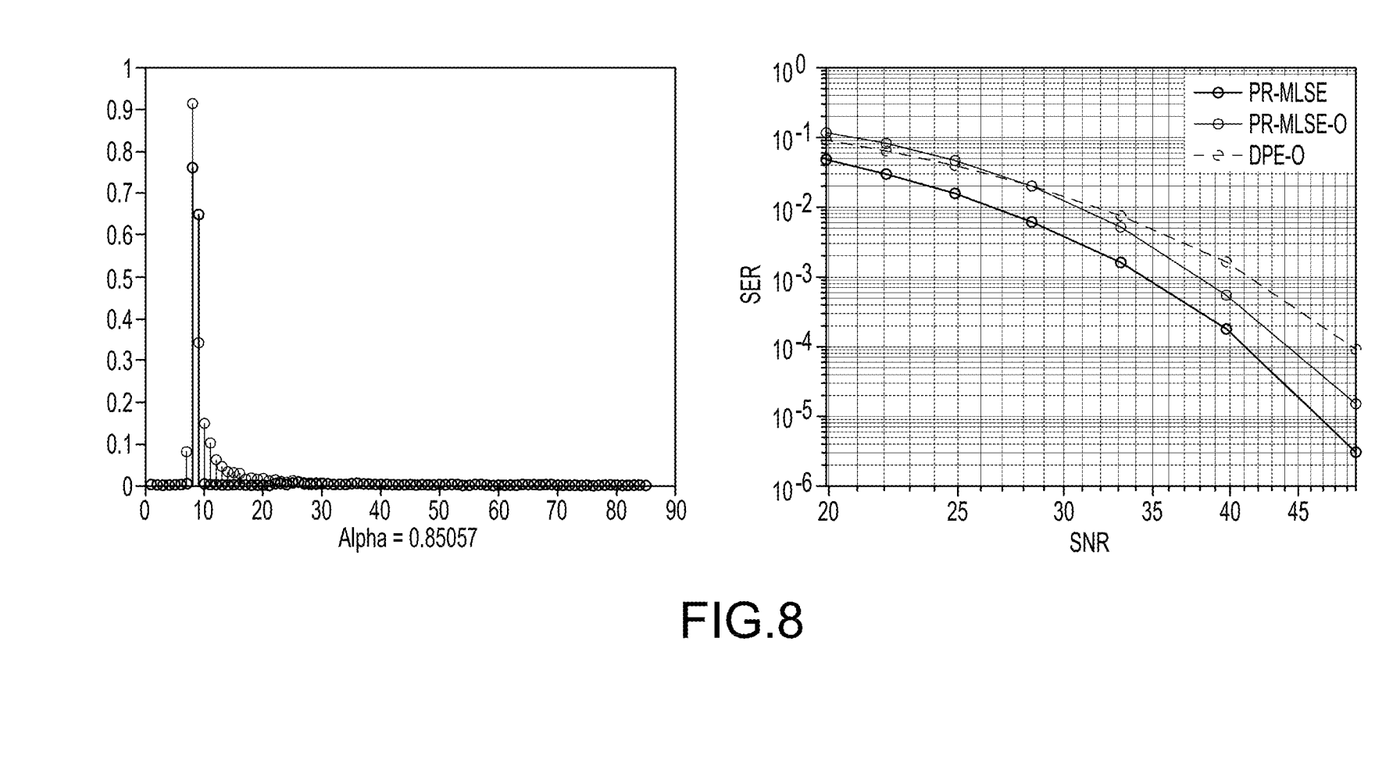

FIGS. 6, 7 and 8 graphically represent the performance of embodiments of the inventive concepts (PR-MLSE-O) and the scope implementation of DFE (DFE-O) and the normal MLSE (PR-MLSE), for three different tested channels, respectively. The diagram on the left of each figure is channel response, while the diagram on the right shows signal error rate (SER) v signal-to-noise ratio (SNR). It can be seen that the embodiments of the inventive concepts correlate nicely with the other two techniques.

The methods of the inventive concepts may be implemented by the processor of an oscilloscope, such as the oscilloscope described above in connection with FIG. 1. Alternatively, the waveform data may be acquired by an oscilloscope, and the measurement computed by a processor remotely of the oscilloscope. Further, the inventive concepts encompass non-transitory computer readable storage media having instructions stored therein that when executed by a processor cause the processor to carry out the methods of the inventive concepts. The inventive concepts encompass non-transitory computer readable storage media embedded within an oscilloscope or external the oscilloscope.

Further, the inventive concepts encompass oscilloscopes configured to acquire the waveform of a signal under test (SUT) and programmed to carry out the methods of the inventive concepts.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. While representative embodiments are disclosed herein, one of ordinary skill in the art will appreciate that many variations that are in accordance with the present teachings are possible and remain within the scope of the appended claim set. The invention therefore is not to be restricted except within the scope of the appended claims.

What is claimed is:

1. A test system implemented method of equalizing a digital signal under test (SUT) resulting in a waveform representation of the output of a Partial Response Maximum Likelihood Sequence Equalizer (PR-MLSE), the method comprising:

applying the SUT, having greater than one symbol period of inter-symbol interference (ISI), to a feed forward equalizer to obtain a Partial Response equalized sequence $r_k$ having an ISI characterized as (1+αD), wherein $r_k$ denotes the kth equalized sample of the waveform, sampled at the symbol rate, and α is a programmable variable;

obtaining a known symbol sequence, $m_k$, as a user input to the system; and determining $y_k$, the kth sample of the PR-MLSE equivalent waveform, in accordance with the following equation, $$\hat{y}_k = \frac{r_k + \alpha r_{k+1} - \alpha(m_{k-1} + m_{k+1})}{1 + \alpha^2}.$$

2. The method of claim 1, wherein the digital SUT is an optical signal.

3. The method of claim 1, wherein the test system is an oscilloscope.

4. The method of claim 3, further comprising generating an eye diagram of the PR-MLSE equivalent waveform on a display on the oscilloscope.

5. A non-transitory tangible computer readable medium having stored thereon executable instructions embodied in the computer readable medium that when executed by at least one processor of a test system cause the test system to execute the method of claim 1.

6. The non-transitory tangible computer readable medium of claim 5, wherein the test system is an oscilloscope.

7. The non-transitory tangible computer readable medium of claim 6, wherein the non-transitory tangible computer readable medium is a memory of the oscilloscope.

8. An oscilloscope comprising:
- an input port configured to receive a digital signal under test (SUT) having greater than one symbol period of inter-symbol interference (ISI);
- a feed forward sampler configured to process the SUT to obtain a Partial Response equalized sequence $r_k$ having an ISI characterized as $(1+\alpha D)$, wherein $r_k$ denotes the kth equalized sample of the waveform, sampled at the symbol rate, and $\alpha$ is a programmable variable;
- a waveform generator configured to generate a Partial Response Maximum Likelihood Sequence Equalizer (PR-MLSE) equivalent waveform in accordance with the following equation, $$\hat{y}_k = \frac{r_k + \alpha r_{k+1} - \alpha(m_{k-1} + m_{k+1})}{1 + \alpha^2}$$

where $m_k$ is a known symbol sequence as a user input to the oscilloscope, and $y_k$ is the kth sample of the PR-MLSE equivalent waveform.

9. The oscilloscope of claim 8, wherein the oscilloscope includes a display and is configured to display an eye diagram of the PR-MLSE equivalent waveform on the display.

* * * * *